(12) United States Patent
Hoffmann et al.

(10) Patent No.: US 11,274,228 B2
(45) Date of Patent: Mar. 15, 2022

(54) COATING AGENT SYSTEM BASED ON SALTS OF AN ALIPHATIC MONOCARBOXYLIC ACID

(71) Applicant: BASF Coatings GmbH, Münster (DE)

(72) Inventors: Peter Hoffmann, Muenster (DE); Benedikt Schnier, Muenster (DE); Emre Levent, Muenster (DE)

(73) Assignee: BASF Coatings GmbH, Muenster (DE)

( * ) Notice: Subject to any disclaimer, the term of this patent is extended or adjusted under 35 U.S.C. 154(b) by 70 days.

(21) Appl. No.: 16/341,131

(22) PCT Filed: Sep. 21, 2017

(86) PCT No.: PCT/EP2017/073922
§ 371 (c)(1),
(2) Date: Apr. 11, 2019

(87) PCT Pub. No.: WO2018/069018
PCT Pub. Date: Apr. 19, 2018

(65) Prior Publication Data
US 2020/0181450 A1 Jun. 11, 2020

(30) Foreign Application Priority Data
Oct. 13, 2016 (EP) .................................. 16193676

(51) Int. Cl.
| C08G 18/22 | (2006.01) |
| C09D 175/04 | (2006.01) |
| C08G 18/62 | (2006.01) |
| C08G 18/72 | (2006.01) |
| C08G 18/73 | (2006.01) |
| C08G 18/75 | (2006.01) |
| C08G 18/79 | (2006.01) |

(52) U.S. Cl.
CPC .......... *C09D 175/04* (2013.01); *C08G 18/225* (2013.01); *C08G 18/227* (2013.01); *C08G 18/6229* (2013.01); *C08G 18/722* (2013.01); *C08G 18/73* (2013.01); *C08G 18/755* (2013.01); *C08G 18/792* (2013.01)

(58) Field of Classification Search
CPC .............. C09D 175/04; C08G 18/6229; C08G 18/722; C08G 18/73; C08G 18/755; C08G 18/792; C08G 18/225; C08G 18/227
See application file for complete search history.

(56) References Cited

U.S. PATENT DOCUMENTS

| 4,598,131 A | 7/1986 | Prucnal |
| 4,939,213 A | 7/1990 | Jacobs, III |
| 5,011,902 A | 4/1991 | Foucht |
| 5,084,541 A | 1/1992 | Jacobs, III |
| 5,716,678 A | 2/1998 | Rockrath et al. |
| 2005/0182189 A1 | 8/2005 | Ohrbom et al. |
| 2012/0107519 A1* | 5/2012 | Klinkenberg ...... C08G 18/4854 427/517 |
| 2015/0322291 A1* | 11/2015 | Salviato ............... C09D 11/101 524/591 |
| 2018/0230329 A1 | 8/2018 | Hoffmann et al. |
| 2018/0282573 A1 | 10/2018 | Hoffmann et al. |
| 2018/0355210 A1 | 12/2018 | Steinmeiz et al. |
| 2018/0362798 A1 | 12/2018 | Steinmetz et al. |
| 2018/0362799 A1 | 12/2018 | Steinmetz et al. |
| 2019/0010353 A1 | 1/2019 | Steinmetz et al. |
| 2019/0055426 A1 | 2/2019 | Steinmetz et al. |
| 2019/0194490 A1 | 6/2019 | Steinmetz et al. |

FOREIGN PATENT DOCUMENTS

| EP | 0008127 A1 | 2/1980 |
| EP | 0249201 A2 | 12/1987 |
| EP | 0276501 A2 | 8/1988 |
| EP | 0624577 A1 | 11/1994 |
| EP | 0692007 A1 | 1/1996 |
| EP | 0994117 A1 | 4/2000 |
| EP | 1273640 A2 | 1/2003 |
| EP | 2841200 B1 | 7/2016 |
| JP | 3696452 B2 * | 9/2005 ............. C08G 18/22 |
| JP | 2007246829 A | 9/2007 |

(Continued)

OTHER PUBLICATIONS

JP-2007246829-A_Sep. 2007_English.*
JP-3696452-B2_Sep. 2005_English.*
Guhl, "Replacing a veritable workhorse," European Coatings Journal, Issue 07-08, 2008, 11 pages.
Römpp Lexikon "Lacke und Druckfarben" Georg Thieme Verlag, Stuttgart, 1998, pp. 250 to 252. No English translation available.
Database WPI Week 200804 Thomson Scientific, London, GB, XP002766058.

(Continued)

*Primary Examiner* — Michael L Leonard

(74) *Attorney, Agent, or Firm* — Armstrong Teasdale LLP

(57) ABSTRACT

A coating material system including components (A) to (C) and also, optionally, further components, with, in a first option, all components (A) to (C) and also, where present, the further optional components being present separately from one another, in other words the individual components not being mixed with one another. In a second option of the coating material system, conversely, the aforementioned components may also be mixed wholly or at least partly with one another. Where the components are at least partly mixed with one another, for example, component (C) is mixed with component (A), while component (B) is present separately from this mixture of (A) and (C). Optionally, component (B) may also be mixed with a portion of component (C). Furthermore, the mixtures of (A) and (C) and of (B) and (C) may additionally include at least one optional component such as a solvent, for example.

18 Claims, No Drawings

(56) References Cited

FOREIGN PATENT DOCUMENTS

| | | | |
|---|---|---|---|
| JP | 2007246829 A * | 9/2007 | ............ C08G 18/22 |
| WO | 9422968 A1 | 10/1994 | |
| WO | 9712945 A1 | 4/1997 | |
| WO | 0109260 A1 | 2/2001 | |
| WO | 2005058996 A1 | 6/2005 | |
| WO | 2012123198 A1 | 9/2012 | |
| WO | 2015130939 A1 | 9/2015 | |
| WO | 2016116586 A1 | 7/2016 | |
| WO | 2016120160 A1 | 8/2016 | |

OTHER PUBLICATIONS

Blank, W. J et al. 1999. Catalysis of the Isocyanate-Hydroxyl Reaction by Non-Tin Catalysts. Available on the Internet at the address http://wemerblank.com/pdfiles/paper16.pdf, accessed Mar. 26, 2019.

English translation of International Search Report for International Application No. PCT/EP2017/073922, dated Dec. 14, 2017, 3 pages.

* cited by examiner

COATING AGENT SYSTEM BASED ON SALTS OF AN ALIPHATIC MONOCARBOXYLIC ACID

CROSS-REFERENCE TO RELATED APPLICATIONS

This application is a U.S. National Phase Application of PCT/EP2017/073922, filed Sep. 21, 2017, which claims the benefit of priority to EP Application No. 16193676.0, filed Oct. 13, 2016, the contents of which are hereby expressly incorporated by reference in their entirety.

The invention relates to a coating material system which comprises components (A) to (C) and also, optionally, further components, with, in a first option, all components (A) to (C) and also, where present, the further optional components being present separately from one another, in other words the individual components not being mixed with one another. In a second option of the coating material system of the invention, conversely, the aforementioned components may also be mixed wholly or at least partly with one another. Where the components are at least partly mixed with one another, this means that, for example, component (C) is mixed with component (A), while component (B) is present separately from this mixture of (A) and (C). Optionally, however, component (B) may also be mixed with a portion of component (C). Furthermore, the mixtures of (A) and (C) and of (B) and (C) may additionally comprise at least one optional component such as a solvent, for example.

Component (A) comprises at least one polyhydroxy group-containing compound and component (B) comprises at least one polyisocyanate-containing compound. Component (C), by contrast, is a catalyst comprising at least two salts of an aliphatic monocarboxylic acid having at least four carbon atoms, the metal component of the first salt comprising bismuth (Bi) and the metal component of the second salt comprising magnesium (Mg), sodium (Na), potassium (K) or calcium (Ca). Further components which may be present in the coating material system of the invention include, for example, hydroxyl-containing compounds (D), coating additives (F), pigments (H) and/or solvents (J).

A further subject of the present invention, then, is also a method for producing polyurethanes which are obtained by curing of the coating material system described above. "Curing" (cure) in the sense of the present invention means that the components (A) and (B) present in the coating material system of the invention react with one another in the presence of the catalyst of component (C) to form a polyurethane. The reaction, i.e., the curing, may proceed at least partially, but preferably there is complete curing, meaning that the components (A) and (B) present in the coating material system of the invention undergo complete or near-complete reaction with one another.

Further subjects of the present invention, accordingly, are also methods for producing the coating material system of the invention. Moreover, the use of the coating material system of the invention or of the polyurethane produced from the coating material system of the invention as, for example, a coating material, more particularly as a clearcoat or as a pigmented paint, is a subject of the present invention.

A further subject of the present invention is a method for producing a coating using the coating material system of the invention, and also the coating as such.

A further subject of the present invention is the use of the catalyst of component (C) of the coating material system of the invention, for the purpose, for example, of producing polyurethanes or of producing a coating material.

The preparation of polyurethanes by reaction of a compound having at least two hydroxyl groups per molecule with a compound having at least two isocyanate groups per molecule already has a long history. Depending on the reactivity of the compounds in question, it is entirely possible for spontaneous and/or partial curing (reaction of the two reactant components) to take place purely by simple mixing of the respective reactant components. For technical reasons, however, spontaneous reaction is to be suppressed, in order to ensure safe operation. In order to allow the reaction to then proceed with sufficient rapidity, however, after mixing and after a certain latency time, recourse is had to what are called catalysts.

Specific preparation of the polyurethane, however, takes place generally in the presence of an appropriate catalyst. In view of the reactivity of the two reactant components of the polyurethane, it is very widespread practice for the reactant components in question to be provided separately from one another, with the catalyst optionally having been possibly added beforehand to the hydroxyl-containing reactant and/or to the isocyanate group-containing reactant. Such systems are widespread in the art under the title "Two-component (polyurethane) systems" (2K systems) and are also available commercially as such. Also conceivable are multicomponent systems with more than two components; it may be the case that one component is not compatible with one or the other component, and that therefore these three components cannot be brought together until directly before application.

An alternative possibility is the provision of one-component systems (mixtures/1K system) in which, for example, the two reactant components and also the catalyst can be provided as a storable mixture by means of blocking of the reactive groups of the individual reactants, as for example by blocking of the free isocyanate groups with suitable blocking agents. In the case of the 1K system, in the individual starting components or optionally in the starting mixture, there are in practice frequently other components present as well, such as solvents or coatings additives.

It is also known that polyurethanes, as coating materials or as a constituent of coating materials, in automotive refinish, for example, have a broad field of application. The polyurethane thus acts as a coating material. The corresponding formulations which comprise at least the polyurethane reactants and also a suitable catalyst, and optionally further components such as coatings additives or solvents, are also referred to as a coating material system or coating material composition.

Polyurethane coating materials, then, typically comprise a catalyst, for which not only acidic compounds but also, in particular, tertiary amines and/or metal compounds are employed, such as various tin compounds, more particularly dibutyltin dilaurate and dibutyltin oxide, for example.

In coating materials as well, the use of tin-containing catalysts is to be avoided, owing to the toxicity inherent in many alkyl-tin compounds. Dibutyltin oxide (DBTO) and dibutyltin dilaurate (DBTL) have been categorized accordingly by the EU Commission "Working Group on Classification and Labelling".

The article "Replacing a veritable workhorse" in European Coatings Journal (issue: 07-08/2008; 11 pages in total, Vincentz Network) describes the disadvantages of tin-containing catalysts in connection with polyurethane production; instead, catalysts based on bismuth and/or zinc can be used.

Accordingly, in the article "Catalysis of the Isocyanate-Hydroxyl Reaction by Non-Tin Catalysts" by Werner J. Blank, Z. A. He, and Ed. T. Hessell from King Industries Inc., available on the Internet at the address www.werner-blank.com (status: Oct. 9, 2014), alternatives to the customary tin-containing catalysts are described, based on different metal salts and metal complexes, such as zirconium chelates, aluminum chelate, and bismuth carboxylate. There is, however, no description of catalysts based on mixtures of bismuth with other metals.

U.S. Pat. No. 5,011,902 discloses a composition for the coating of plywood panels that comprises a noncellular polyurethane elastomer obtained by reacting a polyether or polyester polyol with a polyisocyanate in the presence of a catalyst. The catalyst comprises at least one bismuth compound, but may further comprise other metals as well, such as zinc, antimony, or lithium. The ratio of bismuth to lithium is optionally 1:6.6 to 1:1.6.

WO 2012/123198 A1 describes a coating material composition which comprises at least one polyol, a polyisocyanate, a monomeric, aromatic, optionally substituted carboxylic acid (S) whose carboxyl group is in conjugation with a n-electron system, and also, as catalyst, a zinc-amidine complex. There is no mention, though, of a catalyst containing bismuth.

Another coating material system is described in WO 2016/120160, and is based on at least one polyol, a polyisocyanate, and a catalyst. The metal components in the catalyst used comprise lithium and bismuth in a molar ratio of at least 7:1.

The use of lithium (Li) as a metal component in catalysts is, however, likewise associated with a disadvantage. The availability of sufficient quantities of Li is greatly jeopardized at present because of the sharply increasing use of Li for, for example, electricity storage materials. Alternatives to Li as cocatalysts in conjunction with Bi-containing catalysts are therefore a path of avoidance of any possible scarce availability of lithium.

A coating material system along these lines is disclosed in WO 2016/116586, with the polyol used in this coating material system having an acid number of not more than 9 mg KOH/g. The catalyst used includes lithium as a metal component, and also at least one further metal component selected from tin, bismuth, zirconium and/or aluminum.

EP-B 2 841 200 relates to a process for producing a polyisocyanate-based polymer, the catalyst used comprising a bismuth salt of a thiophosphonic diester.

WO 2005/058996 describes catalysts and methods for producing polyurethanes where the catalyst used comprises a mixture of an organotitanium or organozirconium compound and a bismuth-containing compound, optionally in the presence of an amine.

WO 2015/130939 A1 discloses a composition and a process for producing polyisocyanurate foams or polyurethane foams having improved insulating properties. The composition here comprises at least one polyol, at least one isocyanate, at least one blowing agent, and a catalyst composition. The catalyst composition comprises at least one bismuth carboxylate catalyst and also one or more cocatalysts selected from the group consisting of alkali metal carboxylates and quaternary ammonium carboxylates.

JP 2007 246829 A relates to a two-component polyurethane system one of whose possible uses is as adhesive and sealant. In a first step here, a polyol component and a polyisocyanate component react to form a polyurethane prepolymer. In a second step, this polyurethane prepolymer is cured using an organometallic catalyst.

It was an object of the present invention, therefore, to provide a new coating material system.

The object is achieved by means of a coating material system comprising components (A) to (C) having:

(A) at least one polyhydroxy group-containing compound, (B) at least one polyisocyanate-containing compound, and (C) as catalyst at least two salts of an aliphatic monocarboxylic acid having at least four carbon atoms, the metal component of the first salt comprising bismuth (Bi), and the metal component of the second salt comprising magnesium (Mg), sodium (Na), potassium (K) or calcium (Ca), where i) components (A), (B), and (C) are present separately from one another or ii) are mixed wholly or at least partly with one another.

Among the features of the coating material system of the invention are that the use of toxic, tin-containing catalysts can be avoided and/or that rapid curing is ensured.

Particularly advantageous is the use of catalysts in accordance with above-defined component (C), based on salts of an aliphatic monocarboxylic acid having at least four carbon atoms, since they allow the reaction rate on curing, i.e., on formation of the polyurethane, to be controlled in a precisely targeted way. This can be achieved over a very broad temperature range, beginning, for example, at room temperature (15° C. and upward) through relatively high temperatures of 180° C.

Furthermore, the use of catalysts in accordance with above-defined component (C) is particularly advantageous since it allows the tailoring of the reaction rate of the coating material system as a whole in the subsequent application. For instance, according to the desired profile of requirements for the desired application of coating material, it is possible to implement tailored provision of low or high temperatures, optionally a prolonged pot life, or else more rapid curing. Pot life in accordance with the invention means the length of time for which the coating material system in question can be left in the mixed state without being observed to exhibit deficiencies in terms of quality on corresponding application (coating step). The pot life is determined by way of the gel time. The best pot life values are obtained for a gel time of approximately 20.

Another advantage of the coating material system of the invention is to be seen in the fact that an alternative, and one which functions to comparably good effect, is obtained to the lithium-containing catalysts which, while functioning to good effect in principle, are nevertheless becoming increasingly expensive.

The catalysts of component (C) that are used in accordance with the invention are also advantageous relative to chelate-blocked catalysts, such as acetylacetone (derivatives), for example, since the chelates are too strong in their complexing of the respective metal and they therefore end catalysis too early or at least greatly reduce it. Moreover, these chelating compounds are capable of extracting traces of metals from the customary tinplate cans and often lead to yellowing of the clearcoats after storage. Furthermore, such chelates are in some cases toxic.

By virtue of the catalysts of component (C) used in the coating material system of the invention, therefore, excessively rapid crosslinking is prevented, and so the coating material system is serviceable for a longer time after the mixing of components (A) to (C). Especially in the context of low-temperature curing, therefore, a longer working time is possible, which constitutes an economic advantage. At the same time, however, rapid drying can be achieved. Existing catalysts do not meet these requirements.

Furthermore, it has surprisingly been found that the coating material systems, when using polyhydroxy group-containing compounds having acid numbers of not more than 15 mg KOH/g, cure more rapidly than comparable coating material systems which comprise polyhydroxy group-containing compounds having higher acid numbers. It has been found, moreover, that the coating material systems, when using polyhydroxy group-containing compounds having acid numbers of not more than 15 mg KOH/g, possess higher water resistance and thus weather resistance. They do not take on moisture when stored under moist conditions, and consequently they remain protected against blushing.

A further advantage of the coating material systems of the invention is to be seen in their use for automotive refinishing and for the coating of commercial vehicles. The coating material systems of the invention ensure good assembly strength after just a very short time. As a result, rapid curing is ensured even under the conditions of refinishing and of the finishing of commercial vehicles—that is, after curing at 60° C. for just 30 minutes, curing is already at such an advanced stage that initial assembly work or demasking operations can be carried out without damage to the coating.

For the purposes of the present invention, the terms "binder content" or "binder fraction" and "binder content determination" refer (unless stated otherwise) to the following:

The "binder content" is in each case the fraction of the coating material system that is soluble in tetrahydrofuran (THF), said system comprising components (A) to (C) and also, optionally, (D) to (J). The binder content is determined before the components of the coating material system begin to cure, in other words before curing to give the polyurethane. For the determination, the individual components of the coating material system in question are mixed completely with one another and then a small sample (P) of 1 g of the coating material system is weighed out and dissolved in 100 times the amount of THF, insoluble constituents are removed by filtration, the THF is evaporated off, and then the resulting solids content of the constituents previously dissolved in THF is ascertained by drying at 130° C. for 60 minutes, cooling in a desiccator, and then reweighing. The residue corresponds to the binder content of the sample (P).

The coating material system of the invention and also the other subjects of the present invention are defined in more detail hereinbelow.

The first subject of the present invention is the coating material system already set out above, comprising components (A) to (C) and also, optionally, a further component (D) to (J).

The coating material system of the invention comprises as its component (A) at least one polyhydroxy group-containing (polyhydroxyl group-containing) compound. As polyhydroxy group-containing compound of component (A) it is possible to use all compounds known to the skilled person that have at least two hydroxyl groups per molecule. The number of hydroxyl groups (hydroxy groups) per molecule may be arbitrarily high; it is specified by way of the hydroxy number (OH number), as described hereinafter. The compounds of component (A) are also referred to as "polyols"; they may be oligomeric and/or polymeric. As component (A) it is therefore also possible to use mixtures of two or more oligomeric and/or polymeric polyols (polyhydroxy group-containing compounds).

The polyhydroxy group-containing compounds of component (A) preferably have mass-average molecular weights $M_w \geq 500$ daltons, more particularly $M_w \geq 1000$ daltons. The $M_w$ can be determined by means of gel permeation chromatography (GPC) against a polystyrene standard (see also below in the experimental section). Further preferred are mass-average molecular weights $M_w$ of between 1000 and 20 000 daltons, more particularly between 1500 and 10 000 daltons.

The polyols preferably have an OH number of 30 to 400 mg KOH/g (polyol), more particularly between 100 and 300 KOH/g. The hydroxyl number (OH number) indicates how many mg of potassium hydroxide are equivalent to the amount of acetic acid bound by 1 g of substance (polyol) in the acetylation (of the corresponding polyol with acetic acid). For the determination, the sample is boiled with acetic anhydride-pyridine and the acid formed is titrated with potassium hydroxide solution (DIN 53240-2 (2007-11)). In the case of pure poly(meth)acrylates, the OH number may also be determined with sufficient precision by calculation on the basis of the OH-functional monomers employed.

It is preferred, moreover, for the polyols to have an acid number of between 0 and 50 mg KOH/g. With preference the acid number of the polyhydroxy group-containing compound of component (A) is not more than 30 mg KOH/g of the corresponding polyhydroxy group-containing compound, preferably not more than 15 mg KOH/g of the corresponding polyhydroxy group-containing compound.

The acid number here indicates the number of mg of potassium hydroxide consumed in the neutralization of 1 g of the respective compound (polyol/polyhydroxy group-containing compound) (DIN EN ISO 2114:2006-11).

The glass transition temperatures ($T_g$ values) of the polyols, measured by means of DSC measurements according to DIN EN ISO 11357-2:2011-04-28, may take on any desired values, and are preferably between −150 and 150° C., more preferably between 40 and 120° C.

Preferred polyhydroxy group-containing compounds (polyols) are polyester polyols, polyurethane polyols, polysiloxane polyols, polyacrylate polyols and/or polymethacrylate polyols. Examples of such compounds are listed in Poth, Schwalm, Schwarz: Acrylatharze. Vincentz Verlag Hannover, ISBN: 9783866308718. The aforesaid classes of polymer such as polyacrylate polyols or polymethacrylate polyols may all be used in each case as a homopolymer or as a copolymer (chain-growth copolymer) of at least two different monomers. In the context of the present invention, copolymers are used with preference as polyhydroxy group-containing compounds, particularly in the aforesaid classes of polymer. The classes of polymer are based on at least one hydroxy group-containing monomer building block. Monomers (monomer building blocks) suitable for the particular class of polymer are known to the skilled person. The skilled person also knows the specific (polymerization) processes that can be used for producing the respective polymers from the corresponding monomers. Furthermore, there may also be mixtures of at least two different specific polymers of one class of polymer, and/or mixtures of in each case at least one specific polymer from at least two different classes of polymer, present. It is also possible for copolymers to be present, these being polymers comprising fragments which can be assigned to two or more classes of polymer.

Suitable polyester polyols are described in EP-A-0 994 117 and EP-A 1 273 640, for example. Polyurethane polyols are prepared preferably by reaction of polyester polyol prepolymers with suitable di- or polyisocyanates and are described in EP-A 1 273 640, for example. Suitable polysiloxane polyols are described in WO-A-01/09260, for example, where the polysiloxane polyols recited therein may be employed preferably in combination with further polyols, more particularly those having higher glass transition temperatures.

Component (A) more preferably comprises one or more polyacrylate polyols and/or polymethacrylate polyols. The two aforesaid polymers or classes of polymer are also referred to as poly(meth)acrylate polyols. Together with the polyacrylate polyol(s) and/or polymethacrylate polyol(s) it is possible for further oligomeric and/or polymeric polyhydroxyl group-containing compounds to be used, examples being polyester polyols, polyurethane polyols, and polysiloxane polyols, more particularly polyester polyols.

The poly(meth)acrylate polyols used with more preference as component (A) in accordance with the invention are based preferably on at least one of the monomers (monomer building blocks) listed below. Used more preferably for this purpose is at least one of the following hydroxyl-containing monomer building blocks and optionally at least one of the following monomer building blocks which are not hydroxyl-containing monomer building blocks. Employed with particular preference are copolymers based on at least one hydroxyl-containing monomer building block and at least one monomer building block which contains no hydroxyl groups. Examples of the corresponding monomer building blocks are listed below.

Hydroxyl-containing monomer building blocks used for the poly(meth)acrylate polyols are preferably hydroxyalkyl acrylates and/or hydroxyalkyl methacrylates. They are preferably selected from 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate and/or 4-hydroxybutyl methacrylate. Particularly preferred are the hydroxyl-containing monomer building blocks 4-hydroxybutyl acrylate and/or 4-hydroxybutyl methacrylate. The hydroxyl-containing monomer building blocks are used preferably at 20 to 60 wt %, based on the total monomer amount for the respective polymer.

Further monomer building blocks used for the poly(meth) acrylate polyols are preferably alkyl acrylates and/or alkyl methacrylates. They are preferably selected from methyl acrylate, methyl methacrylate, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, ethylhexyl acrylate, ethylhexyl methacrylate, 3,3,5-trimethylhexyl acrylate, 3,3,5-trimethylhexyl methacrylate, stearyl acrylate, stearyl methacrylate, lauryl acrylate, lauryl methacrylate, cycloalkyl acrylates and/or cycloalkyl methacrylates. Preferred cycloalkyl (meth)acrylates are cyclopentyl acrylate, cyclopentyl methacrylate, isobornyl acrylate, isobornyl methacrylate, or, in particular, cyclohexyl acrylate and/or cyclohexyl methacrylate. Where the above monomers are used, they are employed preferably in amounts of 35 to 80 wt %, based on the total monomer amount.

Further monomer building blocks used for the poly(meth) acrylate polyols may be vinylaromatic hydrocarbons, such as vinyltoluene, alpha-methyl-styrene, or, in particular, styrene, amides or nitriles of acrylic or methacrylic acid, vinyl esters or vinyl ethers, and also acrylic and/or methacrylic acid. If vinylaromatic hydrocarbons are used as monomers, they are employed preferably in amounts of 0.1 to 40 wt %, based on the total monomer amount. If acrylic and/or methacrylic acid is used, this is done preferably in amounts of 0.1 to 5 wt %, based on the total amount of the monomers used.

Furthermore it is possible to use monomer building block compounds which possess a phosphate group. They are prepared by reaction of suitable hydroxyl-containing (meth) acrylic compounds by transesterification.

Such monomers are represented preferably by the general formula (1):

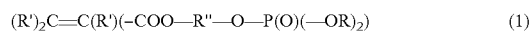

$$(R')_2C\!=\!C(R')(\!-\!COO\!-\!R''\!-\!O\!-\!P(O)(\!-\!OR)_2) \quad (1)$$

where R'=H or CH$_3$
R''=alkyl or alkyl-O-alkyl, and
R'''=H or alkyl.

In the aforesaid radicals R', R'' and R''', alkyl may be branched or unbranched and may optionally be cyclic. The term "alkyl" refers in the context of the present invention to saturated hydrocarbon radicals having at least one carbon atom, such as methyl (C$_1$ alkyl), ethyl (C$_2$ alkyl), or hexyl (C$_6$ alkyl). There is in principle no limit on the number of carbon atoms; preferably there are not more than 18 C atoms per alkyl. If present, such monomers are used in amounts of 0.1 to 20 wt %, based on the total monomer amount. Monomers of these kinds are available commercially, in the form for example of Sipomer PAM® from Rhodia Solvay Group.

The poly(meth)acrylate polyols particularly preferred as component (A) in accordance with the invention are preferably copolymers and preferably have mass-average molecular weights Mw of between 1000 and 20 000 daltons, more particularly between 1500 and 10 000 daltons, measured in each case by means of gel permeation chromatography (GPC) against a polystyrene standard.

The glass transition temperature of the poly(meth)acrylate polyols is generally between −150 and 150° C., more particularly between −40 and 120° C. (measured by means of DSC measurements according to DIN-EN-ISO 11357-2: 2011-04-28).

The poly(meth)acrylate polyols preferably have an OH number of 60 to 250 mg KOH/g (polyol), more particularly between 70 and 200 mg KOH/g.

It is preferred, moreover, for the poly(meth)acrylate polyols to have an acid number of between 0 and 50 mg KOH/g. With preference the acid number of the poly(meth)acrylate polyols of component (A) is not more than 30 mg KOH/g of the corresponding poly(meth)acrylate polyols, preferably not more than 15 mg KOH/g of the corresponding poly (meth)acrylate polyols.

The acid number here indicates the number of mg of potassium hydroxide consumed in the neutralization of 1 g of the respective compound (poly(meth)acrylate polyols) (DIN EN ISO 2114:2006-11).

If the poly(meth)acrylate polyols which are used as component (A) have a low acid number, preferably an acid number of not more than 15 mg of KOH per gram of the corresponding poly(meth)acrylate polyols, it is preferred for the corresponding poly(meth)acrylate polyol to be based on the following monomeric building blocks (the weight percentage figures are based in each case on the total monomer amount in the polymer in question):

20 to 60 wt % of at least one hydroxyalkyl acrylate or hydroxyalkyl methacrylate (as defined above), 35 to 80 wt % of at least one alkyl acrylate or alkyl methacrylate (as defined above), and 0 to 40 wt %, preferably 0.1 to 40 wt %, of at least one vinylaromatic hydrocarbon (as defined above), preferably of styrene.

In the coating material system of the invention, component (A) may be present in principle in any desired proportions known to the skilled person. The proportion of component (A) is preferably from 30 to 80 wt %, more preferably from 50 to 70 wt %, based in each case on the binder content of the coating material system.

The coating material system of the invention comprises as its component (B) at least one polyisocyanate-containing compound. The polyisocyanate-containing compound which can be used includes all of the compounds known for this purpose to the skilled person (see, for example, in Ulrich Meier-Westhues: Polyurethane. Lacke, Kleb- und Dichtstoffe. Vincentz-Verlag, ISBN: 9783866303961, April 2007). Suitability as component (B) is possessed, for example, by substituted or unsubstituted aromatic, aliphatic, cycloaliphatic and/or heterocyclic polyisocyanates that are known per se.

Examples of preferred polyisocyanate-containing compounds are as follows: 2,4-toluene diisocyanate, 2,6-toluene diisocyanate, diphenylmethane 4,4'-diisocyanate, diphenylmethane 2,4'-diisocyanate, p-phenylene diisocyanate, biphenyl diisocyanates, 3,3'-dimethyl-4,4'-diphenylene diisocyanate, tetramethylene 1,4-diisocyanate, hexamethylene 1,6-diisocyanate, 2,2,4-trimethylhexane 1,6-diisocyanate, isophorone diisocyanate, ethylene diisocyanate, 1,12-dodecane diisocyanate, cyclobutane 1,3-diisocyanate, cyclohexane 1,3-diisocyanate, cyclohexane 1,4-diisocyanate, methylcyclohexyl diisocyanates, hexahydrotoluene 2,4-diisocyanate, hexahydrotoluene 2,6-diisocyanate, hexahydrophenylene 1,3-diisocyanate, hexahydrophenylene 1,4-diisocyanate, perhydrodiphenylmethane 2,4'-diisocyanate, 4,4'-methylenedicyclohexyl diisocyanate (e.g., Desmodur® W from Bayer AG), tetramethylxylylene diisocyanates (TMXDI; commercially available for example as TMXDI® from Allnex Belgium SA/NV), and mixtures of the aforementioned polyisocyanates. TMXDI is also referred to as m-TMXDI; bisisocyanatopropylbenzene; m-phenyldimethyl diisocyanate; m-tetramethylxylylene diisocyanate; tetramethyl-m-xylylene diisocyanate; 1,3-bis(2-isocyanato-2-propyl)benzene or 1,3-bis(alpha-isocyanatoisopropyl)benzene.

Preferred polyisocyanate-containing compounds are also the biuret dimers and iminooxadiazinediones of the aforementioned diisocyanates. Also preferred are 1,6-hexamethylene diisocyanate (HMDI), isophorone diisocyanate (IPDI), and 4,4'-methylenedicyclohexyl diisocyanate, the biuret dimers thereof and/or the iminooxadiazinediones thereof and/or the asymmetrical trimers thereof, such as the asymmetric HDI trimer with fractions of asymmetrical trimers that is obtainable commercially under the name Desmodur N3900.

More preferred polyisocyanate-containing compounds are selected from 1,6-hexamethylene diisocyanate, isophorone diisocyanate, 4,4'-methylenedicyclohexyl diisocyanate, the biuret dimers of the aforementioned diisocyanates, the iminooxadiazinediones of the aforementioned diisocyanates and/or the asymmetrical trimers of the aforementioned diisocyanates.

In another embodiment of the invention, the polyisocyanates are polyisocyanate prepolymers having urethane structural units, which are obtained by reaction of polyols with a stoichiometric excess of aforementioned polyisocyanates. Polyisocyanate prepolymers of this kind are described in U.S. Pat. No. 4,598,131, for example.

Polyisocyanate-containing compounds of component (B) may be present in a suitable solvent (J), as further set out below in connection with the solvent (J) and also with the production method for the coating material system of the invention.

If the coating material system of the invention is to be provided as a one-component system (1K system), then preference is given to selecting polyisocyanate group-containing compounds (B) whose free isocyanate groups are blocked with blocking agents. The isocyanate groups may for example be blocked with substituted pyrazoles, more particularly with alkyl-substituted pyrazoles such as 3-methylpyrazole, 3,5-dimethylpyrazole, 4-nitro-3,5-dimethylpyrazole, or 4-bromo-3,5-dimethylpyrazole. Particular preference is given to blocking the isocyanate groups of component (B) with 3,5-dimethylpyrazole. For the formation of polyurethanes (crosslinked urethanes), the polyisocyanates thus blocked are reacted with (further) components (A) at elevated temperature, with a network structure being built up for example by transurethanization and release of the blocking component. At the temperatures prevailing, the blocking agent may optionally escape wholly or partly, or else may remain entirely within the coating film as a further component.

Component (B) in the coating material system of the invention may be present in principle in any desired amounts known to the skilled person. The proportion of component (B) is preferably from 20 to 50 wt %, more preferably from 25 to 40 wt %, based in each case on the binder content of the coating material system.

It is preferred, moreover, for the weight fractions of component (A) and of component (B) in the coating material system of the invention to be selected such that the molar equivalents ratio of the hydroxyl groups of the polyhydroxyl group-containing compounds of component (A) to the isocyanate groups of the polyisocyanate-containing compound of component (B) is between 1:0.9 and 1:1.5, preferably between 1:0.9 and 1:1.2, more preferably between 1:0.95 and 1:1.1. If there is also a hydroxyl group-containing compound of component (D) present in the coating material system of the invention, then its proportion in terms of the aforesaid molar equivalents ratios is taken into account in the weight fraction of component (A). In other words, in this scenario, the sum total of the hydroxyl groups of the polyhydroxy group-containing compound of component (A) and the hydroxyl-containing compound of component (D) is to be taken into account.

The coating material system of the invention comprises as its component (C) as catalyst at least two salts of an aliphatic monocarboxylic acid having at least four carbon atoms, the metal component of the first salt comprising bismuth (Bi), and the metal component of the second salt comprising magnesium (Mg), sodium (Na), potassium (K) or calcium (Ca).

In the coating material system of the invention, the component (C) thus functions as catalyst and comprises at least two salts of an aliphatic monocarboxylic acid having at least four carbon atoms. The metal component of the first salt comprises bismuth (Bi); the metal component of the second salt comprises magnesium (Mg), sodium (Na), potassium (K) or calcium (Ca). This means that in the salt in question, the respective metal forms the cation and the aliphatic monocarboxylic acid forms the corresponding anion.

Mixtures of aliphatic monocarboxylic acids having at least four carbon atoms may also be used here. For the purposes of the present invention, then, it is possible, for example, to use a first salt based on bismuth and two or more second salts, as for example two second salts, where one salt comprises the metal component calcium and one salt comprises the metal component sodium. It is also possible to make use, for example, of two or more different bismuth salts as first salt, with the individual bismuth salts differing in the definition of the anion component, i.e., in the aliphatic monocarboxylic acid having at least four carbon atoms. The same also applies analogously, of course, to the second salt, where it is possible, for example, to use mixtures of two or more sodium salts and/or calcium salts.

The individual salts of an aliphatic monocarboxylic acid having at least four carbon atoms as such that form component (C) in the coating material system of the invention are already known to the skilled person. However, the specific mixtures as per component (C), of at least two salts of an aliphatic monocarboxylic acid having at least four carbon atoms, the first salt comprising bismuth as metal component and the second salt comprising, for example, calcium as metal component, are hitherto unknown. The mixtures can be obtained by simply mixing the individual salts.

The aliphatic monocarboxylic acids having at least four carbon atoms as such are likewise known to the skilled person. The aliphatic monocarboxylic acids therefore have hydrocarbon fragments which may optionally be branched and/or substituted, by aromatics or halogens, for example. The hydrocarbon fragments of the acids in question are preferably linear and unsubstituted. Moreover, it is preferred for the upper limit on the carbon atoms in these hydrocarbon fragments of the aliphatic monocarboxylic acids to be no more than 30 carbon atoms. More preferred are 6 to 18 carbon atoms ($C_6$-$C_{18}$ carboxylic acids); particularly preferred are 8 to 12 carbon atoms ($C_8$-$C_{12}$ carboxylic acids), such as 2-ethylhexanoic acid, n-octanoic acid or neodecanoic acid.

The corresponding salts are present preferably as a solution in the corresponding organic acid—for example, as a solution of neodecanoic acid in the case of Bi neodecanoate. There may also be other substances present, serving to stabilize the compound with respect to traces of water, or else to prevent the tendency toward crystallization.

The catalyst of component (C) is produced preferably by reacting the corresponding hydroxides of Bi, Mg, Na, K and/or Ca with at least one aliphatic monocarboxylic acid having at least four carbon atoms. The reaction takes place preferably with an excess of at least one aliphatic monocarboxylic acid and/or using an aromatic solvent, more particularly xylene, as azeotrope former for removing water. The excess amount of aliphatic monocarboxylic acid, more particularly neodecanoic acid, is preferably selected so as to give an approximately 50% strength solution of the corresponding metal salt in the aliphatic monocarboxylic acid.

It is preferred, moreover, for the first salt and the second salt to have the same aliphatic monocarboxylic acid as anion component of the salt in question.

It is preferred, moreover, for the second salt to comprise sodium (Na) and/or potassium (K) as metal component. For the sake of completeness, it is noted that in the event the second salt comprises both sodium and potassium as metal component, there are in principle at least two second salts present, in the form of a mixture of at least one salt with sodium as metal component and at least one salt with potassium as metal component. The anion component of the respective salts may be the same or different. The K salt and the Na salt preferably have the same anion component of an aliphatic monocarboxylic acid. It is also conceivable, however, to use mixtures of different anion components for the corresponding Na salt and/or the corresponding K salt.

In a further preferred embodiment, the second salt has magnesium (Mg) and/or calcium (Ca) as its metal component. For the sake of completeness, it is also noted here that, where the second salt has both magnesium and calcium as metal components, there are in principle at least two second salts present, in the form of a mixture of at least one salt with magnesium as metal component and at least one salt with calcium as metal component. The anion component of the respective salts may be the same or different. The Ca salt and the Mg salt preferably have the same anion component of an aliphatic monocarboxylic acid. It is also conceivable, however, to use mixtures of different anion components for the corresponding Mg salt and/or the corresponding Ca salt.

The at least two salts which are used as catalyst of component (C) in the coating material system of the invention may be present in any desired molar ratios to one another that are known to the skilled person. Preferably the first salt, with bismuth as metal component, is present in a molar excess over the second salt, comprising magnesium, sodium, potassium or calcium as metal component. More particularly the molar ratio of first salt to second salt is 1.1:1 to 10:1 (mol/mol).

It is preferred, moreover, for the aliphatic monocarboxylic acid in the catalyst of component (C) to be a $C_6$-$C_{18}$ carboxylic acid, more particularly an Mg octoate, Ca octoate, K octoate, Bi octoate or Na octoate, an Mg, Ca, K, Na or Bi salt of $C_{10}$ neodecanoic acid and/or Mg, Ca, K, Na or Bi salt of $C_9$ neononanoic acid.

The catalysts of component (C) may be prepared, for example, by mixing the corresponding salts of organic acids in the corresponding molar ratios. Here it is also possible for the catalyst of component (C) to be produced only in situ in the coating material system of the invention. For example, the calcium-containing component (second salt) and the bismuth-containing component (first salt) of the catalyst may first be provided separately from one another or in each case as a mixture with one each of components (A) or (B).

Besides the at least two salts with the metal component bismuth in the first salt and with the metal components magnesium, sodium, potassium or calcium in the second salt, the catalysts of component (C) may also comprise other metal components as well. Suitable as other metal components in principle are all metals known to the skilled person in connection with the production of polyurethane or coating material systems. The other metal components may be used in principle in any desired molar ratios in relation to bismuth. Employed as other metal component with preference is zinc (Zn), zirconium (Zr) and/or aluminum (Al), more preferably zinc (Zn) and/or zirconium (Zr), in particular zinc (Zn). It is preferred, moreover, for lithium not to be used as other metal component.

Where further metal components are present, these metal components are preferably likewise used in salt form, it being possible also for the salts to have anion components other than aliphatic monocarboxylic acids.

In one preferred embodiment of the present invention, the catalyst of component (C) comprises at least one further salt whose metal component comprises zinc (Zn). It is preferred, moreover, for potassium (K) and/or sodium (Na) to be used as metal component in the second salt.

In a further embodiment of the present invention, apart from the at least two salts based on bismuth (first salt) and on magnesium, calcium, sodium or potassium (second salt), no further catalysts with other metal components are used.

In another embodiment of the present invention it is preferred for the catalyst of component (C) or for the entire coating material system to be largely free or completely free from lithium or lithium-containing compounds.

With preference the entire coating material system is completely free from lithium or lithium-containing compounds.

The term "largely free" from lithium or lithium-containing compounds is understood in the context of the present invention to mean that the amount of lithium or lithium-containing compounds is not more than 5 wt ppm, preferably not more than 1 wt ppm, based on the entire coating material system. The term "completely free" from lithium or lithium-containing compounds in the context of the present invention means that the amount of lithium or lithium-containing compounds is not more than 0.01 wt ppm, preferably not more than 0.001 wt ppm, based on the entire coating material system.

The catalyst of component (C) may be present in principle in any desired amounts known to the skilled person in the coating material system of the invention. Component (C) preferably has a fraction of 35 to 2000 wt ppm, more preferably of 35 to 1000 wt ppm, and very preferably of 100 to 1000 wt ppm, based in each case on the binder content of the coating material system.

In the coating material system of the invention there may optionally be other catalysts used additionally, apart from the above-described catalysts of component (C), these additional catalysts being known to the skilled person in connection with the production of polyurethanes or of coating material systems, but not falling within the definition of the catalysts of component (C).

As already mentioned at the outset, the above-defined components (A) to (C) may i) be present separately from one another or ii) may be mixed wholly or at least partly with one another, in the coating material system of the invention. Where components (A) to (C) are present separately from one another, according to the first option, the system in question is preferably the two-component system (2K system) already mentioned above, the definition of a 2K system also comprehending those systems in which three or more different components are provided. 2K systems for the purposes of the present invention are in principle all coating material systems where components (A) and (B) are present separately from one another, in particular prior to the application of the system in question, as for example in the formation of a polyurethane or of a coating material.

This also means, however, that the coating material systems encompassed in the case of the aforementioned second option, second variant, in which the components (A) to (C) are at least partly mixed with one another, are likewise to be interpreted as a 2K system in the sense of the present invention, provided components (A) and (B) are present separately from one another. In this scenario, however, component (C) may be mixed at least partly or completely with one or both components (A) and (B).

The term "at least partly mixed with one another" has the present meaning in the context of the present invention, this meaning being illustrated exemplarily with an example. For example, component (C) is mixed with component (A), whereas component (B) is present separately to this mixture of (A) and (C). Optionally, however, it is also possible for component (B) to be mixed with a portion of component (C). Furthermore, the mixtures of (A) and (C) and also of (B) and (C) may additionally comprise at least one optional component as defined hereinafter.

Where components (A) to (C) are mixed completely with one another in the coating material system of the invention, in accordance with above-defined second option, first variant, the system in question is preferably a one-component system (1K system) as already mentioned above, in which the free isocyanate groups of component (B) are blocked preferably by suitable blocking agents.

It is possible for the individual components (A) to (C) to be provided each in portions, with individual portions possibly mixed in turn with other components, examples being the optional components described hereinafter. Preferably, however, components (A) and (B) are provided not in parts, but instead in each case as an individual (complete) component. As described above, however, the catalyst of component (C) in particular, in portions and/or in part-components of at least one of the two components (A) and/or (B), may be at least partly mixed with one another. In this scenario, the catalyst of component (C) is prepared preferably in situ immediately prior to the application of the coating material system in question.

In accordance with the invention, all of components (A) to (C) and also, optionally, the optional components described below for the respective coating material system are mixed completely with one another no later than (immediately) prior to the desired application, irrespective of whether the system is a 1K system or a 2K system. Examples of (desired) applications are described in the text below. In the context of these applications, the curing of the coating material system of the invention, already described above, takes place, with formation of polyurethane, by reaction of the components (A) and (B). In view of the in some cases high reactivity of these two components, it is frequently advantageous for these components to be provided separately from one another in the context of the coating material system (i.e., prior to the desired application) (and also in connection with an increased storage stability). Consequently, the polyurethane reaction in the context of the desired application can be regulated and controlled more effectively and/or in a more targeted way.

Besides the components (A) to (C) already described above, the coating material systems of the invention may optionally further comprise at least one further component (D) to (J), which are specified hereinafter.

The optional components (D) to (J) are selected from hydroxyl-containing compounds (D), aminoplast resins and/or tris(alkoxycarbonylamino)triazines (E), coatings additives (F), aromatic carboxylic acids (G), pigments (H), other fillers (I) and/or solvents (J).

In analogy to the components (A) to (C) described above, the optional components (D) to (J) may also be present separately from one another or may be mixed wholly or at least partly with one another and/or mixed with the components (A) to (C).

As an optional component, the coating material system of the invention comprises preferably at least one further component selected from hydroxyl-containing compounds (D), coatings additives (F), pigments (H) and/or solvents (J).

The coating material system of the invention comprises optionally as optional component (D) at least one hydroxyl-containing compound. Hydroxyl-containing (hydroxy group-containing) compounds as such are known to the skilled person. The hydroxyl-containing compound (D) generally has two or more hydroxyl groups, preferably two hydroxyl groups. In the context of the present invention, the hydroxyl-containing compound (D) does not fall within the definition of the above-described polyhydroxy group-containing compound (A).

The hydroxy group-containing compounds (D) are preferably monomeric compounds and/or compounds having a molecular weight<500 g/mol, preferably <200 g/mol. The hydroxyl-containing compounds (D) are also referred to as low molecular mass polyols.

Component (D), where present, has a fraction of 0.5 to 20 wt %, more preferably of 1 to 10 wt %, very preferably of 1 to 5 wt %, based in each case on the binder content of the coating material system.

Preferred examples of a hydroxyl-containing compound (D) that are used are ethylene glycol, neopentyl glycol, 1,3-butanediol, 1,2-propanediol, or diols of dimerized and subsequently hydrogenated natural fatty acids (for example, the commercial product Sovermol® 908). Preference is given to admixing those (low molecular mass) polyols of component (D) in minor fractions to the polyol component (A)—for example, at 1 to 20 wt %, based on the amount of component (A).

The coating material system of the invention comprises optionally, as optional component (E), at least one aminoplast resin and/or at least one tris(alkoxy-carbonylamino) triazine. Compounds which fall within component (E) of the present invention are known to the skilled person. Where present, component (E) has a fraction of 0.5 to 30 wt %, preferably of 0.5 to 15 wt %, based on the binder content of the coating material system.

Examples of suitable tris(alkoxycarbonylamino)triazines are specified in U.S. Pat. No. 4,939,213, in U.S. Pat. No. 5,084,541, and in EP-A 0 624 577.

Examples of suitable aminoplast resins (E) are all aminoplast resins commonly employed in the coatings industry sector, the reactivity of the aminoplast resin allowing the properties of the resulting coating materials to be controlled. The resins in question are condensation products of aldehydes, more particularly formaldehyde, and, for example, urea, melamine, guanamine, and benzoguanamine. The aminoplast resins comprise alcohol groups, preferably methylol groups, which in general are etherified partly or, preferably, completely with alcohols. Aminoplast resins etherified with lower alcohols are used more particularly. Preferred aminoplast resins used are those etherified with methanol and/or ethanol and/or butanol, examples being products available commercially under the names Cymel®, Resimene®, Maprenal®, and Luwipal®.

The aminoplast resins (E) are long-established compounds and are described for example in detail in the American patent application US 2005/0182189 A1, page 1, paragraph [0014], to page 4, paragraph [0028].

The coating material system of the invention comprises optionally, as optional component (F), at least one coatings additive. Coatings additives as such are known to the skilled person. Where present, a coatings additive (F) has a fraction of 0.5 to 30 wt %, preferably of 0.5 to 25 wt %, and more particularly of 1 to 20 wt %, based in each case on the binder content of the coating material system.

Examples of suitable coatings additives (F) are:
in particular, UV absorbers such as, for example, 2-(2-hydroxyphenyl)benzotriazoles, 2-hydroxybenzophenones, hydroxyphenyl-s-triazines, and oxalanilides;
in particular, light stabilizers such as those known as HALS compounds ("hindered amine light stabilizers"; these are derivatives of 2,2,6,6-tetramethylpiperidine; available commercially for example as Tinuvin®292 from BASF SE), benzotriazoles such as hydroxyphenylalkylbenzotriazole, or oxalanilides;
radical scavengers;
slip additives;
polymerization inhibitors;
defoamers;
reactive diluents different from components (A) and (D), more particularly reactive diluents which become reactive only through reaction with other constituents and/or with water, such as Incozol or aspartic esters, for example;
wetting agents different from components (A) and (D), such as siloxanes, fluorine-containing compounds, carboxylic monoesters, phosphoric esters, polyacrylic acids and copolymers thereof, or polyurethanes;
adhesion promoters;
flow control agents, especially those based on a polyacrylate. Employed preferably here are copolymers of ethylhexyl acrylate and ethyl acrylate. These copolymers preferably have a very low $T_g$, are relatively nonpolar, and have a low OH number;
film-forming assistants such as cellulose derivatives;
fillers in the form of nanoparticles based on silicon dioxide, aluminum oxide, or zirconium oxide; for further details, refer to Rompp Lexikon "Lacke and Druckfarben" Georg Thieme Verlag, Stuttgart, 1998, pages 250 to 252;
rheology control additives different from components (A) and (D), such as the additives known from patents WO 94/22968, EP-A-0 276 501, EP-A-0 249 201, or WO 97/12945; crosslinked polymeric microparticles, as disclosed for example in EP-A-0 008 127; inorganic phyllosilicates such as aluminum magnesium silicates, sodium magnesium phyllosilicates and sodium magnesium fluorine lithium phyllosilicates of the montmorillonite type; silicas such as Aerosils®; or synthetic polymers having ionic and/or associative groups such as poly(meth)acrylamide, poly(meth)acrylic acid, polyvinylpyrrolidone, styrene-maleic anhydride copolymers or ethylene-maleic anhydride copolymers and their derivatives, or hydrophobically modified ethoxylated urethanes, or polyacrylates;
flame retardants.

In a preferred embodiment, the coating material system of the invention comprises as additional component at least one coatings additive (F), preferably at least one defoamer. The defoamer preferably comprises polysiloxanes or polyamides. Examples of suitable defoamers are BYK-322, BYK-066 N or BYK-1640 from BYK Additives & Instruments.

The coating material system of the invention comprises optionally as optional component (G) at least one aromatic carboxylic acid. (Monomeric) aromatic carboxylic acids as such are known to the skilled person. The aromatic carboxylic acid of component (G) may be present as or used in the form of the free acid (i.e., in protonated form) or as a salt. Where the aromatic carboxylic acid takes the form of a salt, it may be an alkali metal salt such as an Na salt, for example.

Component (G) in the coating material system of the invention may in principle be present in any desired amounts known to the skilled person. When present, the fraction of the aromatic carboxylic acid (G) is preferably from 0.1 to 5 wt %, more preferably from 0.1 to 3 wt %, very preferably from 0.2 to 1.5 wt %, based on the binder content of the coating material system.

Examples of suitable aromatic carboxylic acids (G) are monomeric aromatic carboxylic acids with optional substitution and whose carboxyl group is in conjugation with a π-electron system. The number of carboxyl groups here may vary, the carboxylic acids preferably having one carboxyl group. The monomeric aromatic, optionally substituted carboxylic acids preferably have a molecular weight<500 g/mol, more preferably <300 g/mol. Preference is given to using monomeric aromatic, optionally substituted, carboxylic acids having a pKa of 2 to 5. The pKa corresponds to the pH at the half-equivalent point, with the solution medium preferably being water. Should it not be possible, for an acid, to specify a pKa in water, then the medium selected is preferably DMSO (dimethyl sulfoxide) or else another suitable medium in which the acid is soluble.

Of preferred suitability are monomeric aromatic monocarboxylic and polycarboxylic acids, the corresponding alkyl- and aryl-substituted aromatic monocarboxylic and polycarboxylic acids, and also the corresponding hydroxyl-containing aromatic monocarboxylic and polycarboxylic acids, examples being phthalic acid and terephthalic acid, alkyl- and/or aryl-substituted phthalic acid and terephthalic acid, benzoic acid and alkyl- and/or aryl-substituted benzoic acid, aromatic carboxylic acids with further functional groups such as salicylic acid and acetylsalicylic acid, alkyl- and/or aryl-substituted salicylic acid, or isomers thereof, polycyclic aromatic carboxylic acids, such as the isomers of naphthalenecarboxylic acid and derivatives thereof.

Preferred as monomeric aromatic carboxylic acid (G) are benzoic acid, tert-butylbenzoic acid, 3,4-dihydroxybenzoic acid, salicylic acid and/or acetylsalicylic acid, with benzoic acid being the preferred aromatic carboxylic acid.

The coating material system of the invention comprises optionally, as optional component (H), at least one pigment. Suitable pigments as such are known to the skilled person (see, for example, in Thomas Brock, Michael Groteklaes, Peter Mischke: European Coatings Handbook, Vincentz Verlag, ISBN 3-86630-849-3).

The fraction of the pigments may in principle be arbitrary; if present, it is preferably situated within a P/B range from 0.1 to 3.0 (P/B describes the weight ratio of pigment (P) to binder (B); binder is to be understood in this case as the sum total of all film-forming components of the coating system).

In accordance with the invention, pigments are used more particularly when the aim with the coating material compositions is to produce pigmented topcoats or pigmented undercoats, more particularly pigmented topcoats.

The coating material system of the invention optionally comprises, as optional component (I), at least one other filler. Other fillers as such are known to the skilled person. Where present, the other filler (I) has a fraction of 0.1 to 30 wt %, based in each case on the binder content of the coating material system.

Examples of suitable other fillers (I) are carbonates, silicon dioxides, or barium sulfates, as they are or else in modified form. In contrast to the fillers described above as examples of coatings additives (F), the other fillers (I) are not nanoscale particles.

The coating material system of the invention optionally comprises, as optional component (J), at least one solvent. Solvents as such, especially in connection with the production of polyurethane or of coating material systems, are known to the skilled person. Where present, the solvent (J) has a fraction of 20% to 80%, preferably of 30% to 50%, based in each case on the total amount of the coating material system of the invention.

Preferred solvents used are those suitable for dissolving the polyisocyanate-containing compounds of component (A) and/or of component (B).

Suitable solvents (J) are those which permit sufficient solubility of the polyisocyanate component and are free from groups reactive toward isocyanates. Examples of solvents of this kind are acetone, methyl ethyl ketone, cyclohexanone, methyl isobutyl ketone, methyl isoamyl ketone, diisobutyl ketone, ethyl acetate, n-butyl acetate, ethylene glycol diacetate, butyrolactone, diethyl carbonate, propylene carbonate, ethylene carbonate, N,N-dimethylformamide, N,N-dimethyl-acetamide, N-methylpyrrolidone, N-ethylpyrrolidone, methylal, butylal, 1,3-dioxolane, glycerol formal, benzene, toluene, xylene, n-hexane, cyclohexane, Solventnaphtha®, 2-methoxypropyl acetate (MPA), and ethyl ethoxypropionate.

In one embodiment of the present invention, the coating material system of the invention comprises at least one further component (D) to (J), selected from hydroxyl-containing compounds (D), aminoplast resins and/or tris (alkoxycarbonylamino)triazines (E), coatings additives (F), aromatic carboxylic acids (G), pigments (H), other fillers (I) and/or solvents (J), where i) the individual components (D) to (J) are present separately from one another or ii) are mixed wholly or at least partly with one another and/or with components (A) to (C).

In a further embodiment of the present invention, the coating material system of the invention comprises at least one further component selected from pigments (H) and/or coatings additives (F), preferably at least one defoamer. Furthermore, in this embodiment it is preferred that the coating material system does not comprise a blowing agent.

It is preferred, furthermore, if i) the coating material system is not aqueous, and/or ii) components (A) and/or (B) each form a mixture with at least one solvent (J), but components (A) and (B) are present separately from one another, and/or iii) the catalyst of component (C) is present entirely or at least partly in at least one of the components (A) or (B) present separately from one another, preferably in component (A).

Where the coating material system is not aqueous, this means that there is preferably no water at all present in such a coating material system, or that water may occur only in the form of impurities or traces, with a maximum amount of 0.1 wt %, preferably of 0.01 wt %, more particularly of 0.001 wt %, based in each case on the total weight of the corresponding coating material system.

In one embodiment, the coating material system of the invention comprises no blowing agent and/or other gas-releasing and/or gas-stabilizing components. Preferably, in this embodiment the coating material system comprises no water, fluorocarbons, carbon dioxide, hydrofluoroolefins and/or silicone surfactants.

In a further preferred embodiment, the coating material system of the invention is present as a complete mixture of components (A), (B) and (C) and also of optionally present components (D) to (J).

In one embodiment of the present invention the coating material system comprises the following components:

50 to 70 wt % (based on the binder content of the coating material system) of at least one polyhydroxy group-containing compound (A), preferably of at least one poly(meth)acrylate polyol, 25 to 40 wt % (based on the binder content of the coating material system) of at least one polyisocyanate-containing compound (B), 100 to 1000 ppm by weight (based on the binder content of the coating material system) of at least one catalyst (C), 0 to 10% by weight, preferably 1 to 5% by weight (based on the binder content of the coating material system) of at least one hydroxyl-containing compound (D), 0 to 25 wt %, preferably 1 to 10 wt % (based on the binder content of the coating material system) of at least one coatings additive (F), and 0 to 300 wt %, preferably 1 to 100 wt % (based on the binder content of the coating material system) of at least one pigment (H).

In this embodiment, moreover, the coating material system of the invention may also comprise at least one solvent (J). Where a solvent is present, it is included in amounts of 1 to 80 wt %, preferably 5 to 50 wt %, of at least one solvent (J). In contrast to the other components, the solvent content is based on the overall amount of the coating material system of the invention.

A further subject of the present invention, accordingly, is also a method for producing a coating material system as described above. The production method as such is known to the skilled person. If the mandatory components and also, optionally, the optional components of the coating material system are mixed wholly or at least partly with one another, the skilled person knows how such mixing can be implemented. The sequence and/or duration of the individual mixing steps are in principle arbitrary; all of the components may optionally be mixed simultaneously with one another. Where the mandatory components, and also those present optionally, of the coating material system of the invention are present separately from one another they are analogously mixed immediately before the application of the coating material system in question.

In one embodiment the method of the invention for producing a coating material system is carried out such that components (A), (B) and (C) and also the optionally present components (D) and (J) are provided separately from one another and then mixed with one another. Mixing takes place preferably at room temperature; components (A) and (C) are mixed with one another beforehand and/or a mixture comprising component (A) is added.

The aforementioned embodiment is preferably carried out immediately before the specific application of the coating material system of the invention. This means that complete mixing of all of the mandatory components (A) to (C) present in the coating material system of the invention, and also the optionally present components (D) to (J), is not achieved until immediately before the specific application of the coating material system of the invention. The term "immediately before the specific application" embraces a time span from approximately one minute up to two hours.

A further subject of the present invention, therefore, is also a method for producing a polyurethane by at least partly or completely curing the above-described coating material system of the invention. The polyurethane is preferably fully cured. The curing of the coating material system of the invention takes place after complete mixing of all the components of the coating material system, more particularly after the mixing of components (A) and (B). If component (B), in the context of a 1K system, is to additionally be protected (blocked) with blocking agents, the blocking agent must first of all be removed before a urethane reaction can take place to produce the polyurethane of the invention. The method for production of the polyurethane therefore takes place preferably as part of a specific application of the coating material system of the invention. The production of a polyurethane as such, and the implementation of the curing, are known to the skilled person and have also already been acknowledged in the introductory part of the present invention.

Expressed in other words, this means that the desired/specific application of the coating material system of the invention forms polyurethane by curing of a coating material based on components (A) and (B) in the presence of the catalyst (C); the polyurethane is formed preferably in layer form or as a coating.

The curing of the coating material (system) of the invention that has been applied may also take place, however, after a certain resting time. The resting time serves, for example, for the flow and the degassing of the coating films, or for the evaporation of volatile constituents such as solvents. The resting time may be assisted and/or shortened by the application of increased temperatures and/or by a reduced atmospheric humidity, provided this does not entail any instances of damage or alteration to the coating films, such as premature complete crosslinking, for instance.

The thermal curing of the coating material system has no peculiarities in terms of method, but instead can take place in accordance with the customary and known methods such as heating in a forced air oven or irradiation with IR lamps. The thermal cure here may also take place in stages. Another preferred curing method is that of curing with near infrared (NIR radiation).

The thermal curing takes place advantageously at a temperature of 20 to 200° C. for a time of 1 min up to 10 h; at low temperatures, longer curing times may also be employed. For automotive refinishing and for the painting of plastics parts, and also for the painting of commercial vehicles, relatively low temperatures are usually employed, lying preferably between 20 and 80° C., more particularly between 20 and 60° C.

The polyurethane produced by the method of the invention preferably forms a layer or coating or is at least part of a layer or coating; the layer or coating is preferably a coating film.

The polyurethane preferably comprises at least one pigment (H) and/or the polyurethane is applied in layer form on a basecoat film, which optionally comprises at least one pigment (H), or on an optionally precoated substrate.

It is preferred, moreover, for the curing of the polyurethane to take place at temperatures of 20 to 80° C., preferably of 20 to 60° C., the optional basecoat film having optionally been dried beforehand at temperatures of 20° C. to 80° C.

A further subject of the present invention is therefore also polyurethane produced by the methanol as described above.

A further subject of the present invention is therefore also the use of the above-described coating material system of the invention and/or of the above-described polyurethane of the invention, produced by the above-described method, as coating material, in automotive finishing, for the repair of finishes, for automotive refinishing and/or for the coating of parts for installation in or on automobiles, of plastics substrates, or of commercial vehicles, the coating material preferably being a clearcoat or a pigmented paint.

Since the coatings of the invention produced from the coating material systems of the invention exhibit outstanding adhesion even to already cured electrocoat systems, surfacer systems, basecoat systems, or customary and known clearcoat systems, they are outstandingly suitable not only for use in automotive production-line (OEM) finishing but also for automotive refinishing and/or for the coating of parts for installation in and on automobiles and/or for the coating of commercial vehicles.

Application of the coating material systems of the invention may be made by any customary application methods such as, for example, spraying, knifecoating, brushing, pouring, dipping, impregnating, trickling, or rolling. At application, the substrate to be coated may itself be at rest, with the application equipment or unit being moved. Alternatively, the substrate to be coated, more particularly a coil, may also be moved, with the application unit being at rest relative to the substrate or being moved appropriately.

Preference is given to employing spray application methods, such as, for example, compressed air spraying, airless spraying, high-speed rotation, electrostatic spray application (ESTA), optionally in conjunction with hot spray application, such as hot air spraying, for example.

The coating materials of the invention are outstandingly suitable as decorative, protective and/or effect coatings and coating systems for bodies of means of transport (especially powered vehicles, such as bicycles, motorcycles, coaches, trucks, or automobiles) or parts thereof; for the interior and exterior of edifices; for furniture, windows, and doors; for plastics moldings, more particularly CDs and windows; for small industrial parts, and for coils, containers, and packaging; for white goods; for films; for optical, electrical, and mechanical components; and also for hollow glassware and articles of everyday use.

The coating material systems of the invention can therefore be applied, for example, to an optionally precoated substrate, it being possible for the coating materials of the invention to be either pigmented or unpigmented. The coating material systems and paint systems of the invention, more particularly the clearcoat systems, are employed in particular in the technologically and esthetically particularly demanding field of automotive production-line (OEM) finishing and for the coating of plastics parts for installation in or on automobile bodies, more particularly for top-class automobile bodies, such as, for example, for producing roofs, tailgates, hoods, fenders, bumpers, spoilers, sills, protective strips, side trim, and the like, and also for automotive refinishing and for the finishing of commercial vehicles, such as, for example, of trucks, chain-driven construction vehicles, such as crane vehicles, wheel loaders, and concrete mixers, for example, buses, rail vehicles, watercraft, aircraft, and also agricultural equipment such as tractors and combines, and parts thereof.

The plastics parts consist customarily of ASA, polycarbonates, blends of ASA and polycarbonates, polypropylene, polymethyl methacrylates, or impact-modified polymethyl methacrylates, more particularly of blends of ASA and polycarbonates, preferably with a polycarbonate fraction>40%, more particularly >50%.

"ASA" refers in general to impact-modified styrene/acrylonitrile polymers, in which graft copolymers of vinylaromatic compounds, more particularly styrene, and of vinyl cyanides, more particularly acrylonitrile, are present on polyalkyl acrylate rubbers in a copolymer matrix of, in particular, styrene and acrylonitrile.

With particular preference the coating material systems of the invention are employed in multistage coating processes, more particularly in processes in which an optionally pre-coated substrate is coated first with a pigmented basecoat film and thereafter with a film with the coating material composition of the invention. Also subject matter of the invention, accordingly, are multicoat color and/or effect finishes comprising at least one pigmented basecoat film and at least one clearcoat film disposed thereon, these finishes being characterized in that the clearcoat film has been produced from the coating material composition of the invention.

Not only water-thinnable basecoats but also basecoats based on organic solvents can be used. Examples of suitable basecoats are described in EP-A 0 692 007 and in the documents recited at column 3, lines 50 ff., therein. The applied basecoat is preferably first dried—that is, at least some of the organic solvent and/or water is removed from the basecoat film in an evaporation phase. Drying takes place preferably at temperatures from room temperature to 80° C. After drying has taken place, the coating material composition of the invention is applied. The two-coat finish is subsequently baked, preferably under conditions employed in the context of automotive OEM finishing, at temperatures of 20 to 200° C., for a time of 1 min up to 10 h; in the case of the temperatures employed for automotive refinishing, which are in general between 20 and 80° C., more particularly between 20 and 60° C., longer cure times may also be employed.

In a further preferred embodiment of the invention, the coating material system of the invention is used as a transparent clearcoat for the coating of plastics substrates, more particularly of plastics parts for interior or exterior installation. These plastics parts for interior or exterior installation are preferably coated likewise in a multistage coating process, in which an optionally precoated substrate or a substrate pretreated for enhanced adhesion of the subsequent coatings (for example by flaming, corona treatment, or plasma treatment of the substrate) is coated first with a pigmented basecoat film and thereafter with a film with the coating material composition of the invention.

A further subject of the present invention is therefore also a method for producing a coating, in which at least one coating material system of the invention is applied to an optionally precoated substrate or to a basecoat film.

The coating (layer, film) preferably comprises a polyurethane obtained by at least partial or complete curing, preferably by complete curing, of the coating material system.

A further subject of the present invention is therefore also a coating (or layer) obtainable by the above-described method for producing the coating.

A further subject of the present invention is therefore also the use of at least two salts of an aliphatic monocarboxylic acid having at least four carbon atoms, the metal component of the first salt comprising bismuth (Bi) and the metal component of the second salt comprising magnesium (Mg), sodium (Na), potassium (K) or calcium (Ca), as catalyst in a coating material system of the invention as described above, for catalyzing the urethane reaction in a coating material system, for producing polyurethanes, for producing a polyurethane as set out above, for producing a coating as set out above, for producing a coating material, for automotive refinishing and/or for coating parts for installation in or on automobiles, for coating plastics substrates or for coating commercial vehicles.

The invention is illustrated below with examples.

1 Measurement of Gel Time

The gel time is measured by moving a test die, fixed on a robot arm, in the coating mixture. This test die is produced from a commercial threaded rod 4 mm in diameter with a washer $d_2$=12 mm, h=1 mm, fixed thereon by means of two nuts. This threaded rod is fixed to a robot arm in such a way that the washer projects into the test mixture. The energy needed for the movement can be recorded through an up-and-down movement (constant time and constant travel) of the robot arm. The energy needed to move the test body is dependent on the viscosity of the surrounding coating mixture. The system is calibrated with commercial calibrating oils for derivation of a viscosity variable.

Instrument name: Texture Analyser TA.XT.Plus, Stable Micro Systems

Measuring conditions: preliminary speed: 1.00 mm/s
  test speed: 5.00 mm/s
  reverse speed: 5.00 mm/s
  travel: 5.3 mm, hold time: 1.00 s Measurement takes place at standard temperature (23° C.)

Evaluation: the measurements obtained by the calibration are plotted against time. By combining the starting value up to a viscosity of X, the slope of the line gives a value which describes the reactivity of the systems. Generally speaking, a value of X=1 Pa*s is used as a maximum.

2 Onset Temperature (DMA Analyses)

The determination of the crosslinking onset temperature based on a dynamic mechanical analysis of the viscosity profile as a function of temperature and time (DMA) was measured for different catalyst compositions (table 3.1). The measurements were carried out directly after addition of the curing agent solution to the mixing varnish. The viscosity profile was analyzed at a temperature range of 5° C. to 200° C. Evaluation took place via the extrapolated onset temperature position of the network buildup from the E' profile (storage modulus) and the extrapolated network buildup from the tan-δ profile (loss factor). A comprehensive description of dynamic mechanical analysis can be found in the literature. (See, for example, G. W. Ehrenstein, *Praxis der thermischen Analyse von Kunststoffen/Gottfried W. Ehrenstein/Gabriela Riedel/Pia Trawiel*, Munich: Hanser, 2003).

Thermal analysis DMA Triton, Triton Technology Mettler Lacerta Technology

Measuring conditions: frequency: 1 Hz; amplitude: 0.01 mm
  2° C./min from about 5° C. to 200° C.

3 Measurement of NCO Conversion

IR spectrometer FT-IR Spectrometer 7000 e, Agilent

Measuring range: 500-4000 cm$^{-1}$

The catalytic crosslinking reaction between an NCO group (polyisocyanate) and an OH group (for example, OH-functional polyacrylate of component (A)) to form a polyurethane is investigated by means of heatable horizontal ATR-IR spectroscopy at 60° C. The measurements here were made directly after addition of the curing agent solution to the mixing varnish. The first measurement at 40° C. defines the starting point. The reaction was subsequently monitored in 5-minute steps over a time of 30 minutes at 60° C. The length of the heating phase to 60° C. is around 5 minutes. The conversion was determined from the decrease in the intensity of the band for the free isocyanate at 2260 cm$^{-1}$. The spectra were standardized by reference to the isocyanurate band at 1690 cm$^{-1}$.

In order to obtain an easier interpretation of these curves, it is necessary to establish a comparison variable. For this purpose, for the crosslinking reaction between an NCO group and an OH group to form a urethane group, a 2nd order reaction was assumed. On the assumption that the initial concentration of the polyisocyanate and of the polyol are the same, the reaction rate law is as follows:

$$-\frac{d[NCO]}{dt} = k \cdot [NCO]^2 \quad (4)$$

Rearranged, equation 4 gives:

$$d\frac{[NCO]}{[NCO]^2} = k \cdot dt \quad (5)$$

Integrating the above equation gives:

$$-\int_{[NCO]_0}^{[NCO]} \frac{d[NCO]}{[NCO]^2} = k \cdot \int_0^t dt \quad (6)$$

By solving the integral and by inserting the integration limits, the following linear equation is produced:

$$\frac{1}{[NCO]} = k \cdot t + \frac{1}{[NCO]_0} \quad (7)$$

Plotting the reciprocal NCO concentration against the time t produces a straight line whose slope gives the reaction rate constant k (equation 7). The reaction rate constant thus determined is multiplied, for clarity, by a factor of $10^4$. According to equation 7, therefore, the values thus obtained have dimensions of $10^{-4}$ L mol$^{-1}$ s$^{-1}$. The initial concentration of the isocyanate here was 1.184 mol L$^{-1}$.

4 Drying Recorder:

The coating material is drawn down using a 100μ four-way bar applicator onto glass panels with dimensions of 280 mm×25 mm. The Byk dry time recorder is used to draw needles over the film at a defined speed at room temperature (20-23° C.) and a relative humidity of 40% to 60%. This operation is commenced within 5 minutes after application. Here, three different phases and also the total length (i.e., sum of phase 1+phase 2+phase 3) of the track are assessed.

Phase 1: the needle leaves a deep furrow in the coating material

Phase 2: the needle track causes distinct damage to the surface

Phase 3: the needle leaves only a fine scratch

Assessment is always made against a standard.

Evaluation: the end of the respective phase in cm is reported in each case. Hypotheses can be derived from the total length of all the phases and from the respective length of the individual phases.

5 Components 5.1 Component A1

A 4 l stainless steel reactor in pressure design, equipped with two feed vessels, a reflux condenser, and a stirring member, is charged with 487 g of butyl acetate. One of the feed vessels is charged with a mixture of 479 g of styrene, 242.2 g of methyl methacrylate, 164 g of n-butyl acrylate, 298 g of butyl methacrylate, 33.4 g of methacrylic acid and 763 g of hydroxypropyl methacrylate. The second feed vessel is charged with 198 g of tert-butyl per-2-ethylhexanoate with 86 g of butyl acetate. At a pressure of 3 bar absolute, the reactor charge is heated to 140° C. When the temperature is reached, the initiator feed is started; the overall feed time is 270 minutes. 5 minutes after the start of the initiator feed, the monomer feed is commenced, and is fed in over 240 minutes. After the end of both feeds, the batch is held at 140° C. for a further 60 minutes, after which it is cooled down and let down. The solids content of the resin solution is adjusted with methyl ethyl ketone to 65%±1%.

The polyacrylate polyol thus synthesized (in the form of a solid resin) has an acid number of 14.1 mg KOH/g resin solids and a solids content of 64.0%. The viscosity of the resin solution is 3483 mPas, measured using a rotary viscometer (Brookfield CAP 2000, spindle 3, 2500 s$^{-1}$). The OH number works out at 150 mg KOH/g (resin solids). The molecular weight of the resin is Mn=2608 D and Mw=5990 D (determined by means of GPC/see below).

The solids content (solids) is measured as follows: on a metal lid with a diameter of about 6-8 cm, a sample of polyacrylate polyol in solid resin form is applied in an amount of 1 g to an analytical balance. Following addition of 1 ml of a suitable solvent (butyl acetate), the metal lid is dried in a forced air oven at 130° C. for 60 minutes. The residue which remains represents the solids content of the polyacrylate polyol in solid resin form. A duplicate determination is performed in each case.

The gel permeation chromatography (GPC) is carried out at 40° C. using a high-pressure liquid chromatography pump and a refractive index detector. The eluent used is tetrahydrofuran, with an elution rate of 1 ml/min. Calibration is performed using a poly-MMA standard. The number-average molecular weight Mn, the weight-average molecular weight Mw, and Mp are determined, with the polymolecularity index Mp being calculated from Mp=Mw/Mn.

5.2 Component A2

A 4 l stainless steel reactor in pressure design, equipped with two feed vessels, a reflux condenser, and a stirring member, is charged with 487 g of butyl acetate. One of the feed vessels is charged with a mixture of 479 g of styrene, 275.6 g of methyl methacrylate, 164 g of n-butyl acrylate, 298 g of butyl methacrylate, and 763 g of hydroxypropyl methacrylate. The second feed vessel is charged with 198 g of tert-butyl per-2-ethylhexanoate with 86 g of butyl acetate. At a pressure of 3 bar absolute, the reactor charge is heated to 140° C. When the temperature is reached, the initiator feed is started; the overall feed time is 270 minutes. 5 minutes after the start of the initiator feed, the monomer feed is commenced, and is fed in over 240 minutes. After the end of both feeds, the batch is held at 140° C. for a further 60 minutes, after which it is cooled down and let down. The solids content of the resin solution is adjusted with methyl ethyl ketone to 64%±1%.

The polyacrylate polyol thus synthesized (in the form of a solid resin) has an acid number of 1.5 mg KOH/g resin solids and a solids content of 63.0%. The viscosity of the resin solution is 938 mPas, measured using a rotary viscometer (Brookfield CAP 2000, spindle 3, 2500 s$^{-1}$). The OH number works out at 150 mg KOH/g (resin solids). The molecular weight of the resin is Mn=1654 and Mw=3989 D.

5.3 Curing Agent Solution, Corresponding to Component B

A mixture of 95 parts of HMDI trimer (NCO content 23.5±0.5%) with 5 parts of an IPDI trimer (NCO content 11.9±0.4%) is diluted to a solids content of 85% in a 1:1 mixture of butyl acetate and xylene.

5.4 Diluent

1:1 mixture of xylene/butyl acetate (solvent)

5.5 Catalyst (Component C)

To produce the catalyst component, the corresponding hydroxides of the stated alkali metals and alkaline earth metals are dissolved in an excess of neodecanoic acid. With addition of xylene as azeotrope former, the water formed is removed by distillation on a rotary viscometer. The excess quantity of neodecanoic acid is selected so as to give approximately 50% strength solutions of the metal salt in neodecanoic acid. The metal content was determined analytically by ICP. The solutions are crystallization-stable over a long time.

C1: Bi neodecanoate in neodecanoic acid with a bismuth metal content of 23%

C2: Ca neodecanoate in neodecanoic acid with a calcium metal content of 5%

C3: K neodecanoate in neodecanoic acid with a potassium metal content of 5.7%

C4: Na neodecanoate in neodecanoic acid with a sodium metal content of 5.9%

C6: Mg neodecanoate in neodecanoic acid with a magnesium metal content of 3.6%

C7: Tib-Kat 716 from TIB Chemicals, Mannheim (DOTL). This is a tin (Sn)-containing catalyst which contains dioctyltin dilaurate but no other metal components, such as Bi, K, Na, Ca or Mg.

5.6 Paint Formula=Mixing Varnish

TABLE 1

| | | |
|---|---|---|
| 1 | Component A* | 85.1 |
| 2 | Ethyl ethoxypropionate | 8.75 |
| 3 | Tinuvin 292 BASF SE | 0.9 |
| 4 | Hydroxyphenylalkyl-benzotriazole | 1.3 |
| 5 | Catalyst solution** | |
| 6 | Component B | 32 |
| 7 | Diluent | 32 |

The figures for the concentrations are absolute amounts (expressed in parts), based on the overall coating formulation.

* by combining the two binders A1 and A2 it is possible to set the corresponding acid numbers. For example, with 100 parts of component A1 an acid number of about 15 mg KOH/g is produced.

A mixture of the two components A1 and A2 in equal parts produces an acid number of 8 mg KOH/g. Similarly, when using only component A2, an acid number of 1.5 mg KOH/g is obtained.

** in table 2, the respective amounts of the metals are reported in mmol, based on the catalyst definitions C1-C7. From the composition of the respective catalyst solutions it is possible, accordingly, to calculate the quantities employed.

To produce the coating materials, items 1-4 from table 1 are combined with stirring. Following addition of the corresponding catalyst solution, component B is added. Item 7 can be used wholly or partly in order to dilute the catalyst solution for greater ease of handling. The same applies in respect of any dilution that may be necessary to component B. Component 7 can be added generally at any point in the formula. In the case of comparative example V1, additionally, benzoic acid at 1.14 parts is used in the coating formula. Benzoic acid is dissolved with stirring following the addition of the catalyst and before the addition of item 7, in the mixture of items 1 to 5.

TABLE 2

| Ex. | | AN | Bi | Li | K | Na | Ca | Mg |
|---|---|---|---|---|---|---|---|---|
| V1 | DOTL | 15 | | | | | | |
| V2 | Bi/Li | 15 | 0.2 | 3.0 | | | | |
| V3 | Bi | 15 | 0.3 | | | | | |
| E1 | Bi/K | 15 | 0.5 | | 0.05 | | | |
| E2 | Bi/K | 8 | 0.28 | | 1.15 | | | |

TABLE 2-continued

| Ex. | | AN | Bi | Li | K | Na | Ca | Mg |
|---|---|---|---|---|---|---|---|---|
| E3 | Bi/Ca | 1 | 0.28 | | | | 1.03 | |
| E4 | Bi/Ca | 8 | 0.28 | | | | 1.03 | |
| E5 | Bi/Na | 15 | 0.5 | | | 0.05 | | |
| E6 | Bi/Mg | 8 | 0.275 | | | | | 0.05 |
| E7 | Bi/Mg | 15 | 0.275 | | | | | 1.575 |
| E8 | Bi/Mg | 15 | 0.05 | | | | | 3.1 |
| E9 | Bi/Mg | 1 | 0.275 | | | | | 1.575 |
| V4 | Bi | 20 | 0.3 | | | | | |
| V5 | Bi | 25 | 0.3 | | | | | |
| E10 | Bi/Na | 1 | 0.5 | | | 0.05 | | |
| E11 | Bi/Na | 8 | 0.5 | | | 0.05 | | |
| E12 | Bi/Na | 20 | 0.5 | | | 0.05 | | |
| E13 | Bi/Na | 25 | 0.5 | | | 0.05 | | |
| E14 | Bi/Mg | 1 | 0.275 | | | | | 0.05 |
| E15 | Bi/Mg | 15 | 0.275 | | | | | 0.05 |
| E16 | Bi/Mg | 20 | 0.275 | | | | | 0.05 |
| E17 | Bi/Mg | 25 | 0.275 | | | | | 0.05 |
| E18 | Bi/Mg | 8 | 0.275 | | | | | 1.575 |
| E19 | Bi/Mg | 20 | 0.275 | | | | | 1.575 |
| E20 | Bi/Mg | 25 | 0.275 | | | | | 1.575 |
| E21 | Bi/C | 15 | 0.28 | | | | 1.03 | |
| E22 | Bi/C | 20 | 0.28 | | | | 1.03 | |
| E23 | Bi/C | 25 | 0.28 | | | | 1.03 | |
| E24 | Bi/K | 15 | 0.28 | | 1.15 | | | |
| E25 | Bi/K | 20 | 0.28 | | 1.15 | | | |
| E26 | Bi/K | 25 | 0.28 | | 1.15 | | | |

AN = acid number in mg KOH/g (solids content) from the mixing ratio of components A1 and A2
Concentration of the metals: in each case in mmol (metal) based on total mixture V1 to V5 are comparative examples and E1 to E26 are working examples 6 Results/Discussion
a)

TABLE 3

| | Onset [° C.] | $K*10^{-4}$ [L mol$^{-1}$ s$^{-1}$] | M [Gel] | DR P1 [cm] | DR P2 [cm] | DR P3 [cm] |
|---|---|---|---|---|---|---|
| V1 | 53 | 12 | 16 | 5.4 | 9.9 | 13.6 |
| V2 | 42 | 27 | 19 | 7.5 | 11.1 | 20.2 |
| V3 | 78 | 7.8 | — | 8.9 | 14.7 | 29.1 |
| E1 | 39 | 12 | 21 | 2.3 | 4.8 | 9 |
| E2 | 48 | 7 | 6 | 6.9 | 10.6 | 17.6 |
| E3 | 40 | 22 | 16 | 8.6 | 15.6 | 22.6 |
| E4 | 41 | 13 | 21 | 3.2 | 6.2 | 8.2 |
| E5 | 39 | 11 | 65 | 3 | 4.6 | 11.8 |
| E6 | 44 | 9 | 16 | 5.4 | 9.2 | 11.5 |
| E7 | 47 | 16 | 13 | 5 | 6.7 | 14.5 |
| E8 | 56 | 12 | 12 | 8.5 | 15.8 | 17 |
| E9 | 42 | 25 | 18 | 4.4 | 6.6 | 10.2 |

DR P1 = Drying Recorder End of Phase 1
DR P2 = Drying Recorder End of Phase 2
DR P3 = Drying Recorder End of Phase 3

The evaluation of the various phases 1 to 3 is explained under section 4.

The investigations of table 3 produce a picture of the drying properties of the coating films. In the case of crosslinking at low temperatures it is desirable on the one hand for the crosslinking to commence very early (low onset temperature), but on the other hand the reaction rate at room temperature should not be so quick as to adversely affect the working time (gel time moderate).

The measurement of the reduction in NCO groups (high value!) by IR-spectroscopic investigation then provides information on the crosslinking properties of the coating film at elevated temperature. Here it is desirable for the coating films to have only a low level of detectable NCO groups after a time X. This measurement then provides information on the degree of crosslinking of the coating film at the end of the forced drying.

The results from the experiments using the drying recorder method show that the properties of the film in phase 1 can be derived from the two variables of onset temperature and gel time. Very low onset temperatures show a short phase 1 only when the gel time is high at the same time. From the length of phase 3, which gives an idea of the attainment of assembly strength, it is possible to see that the combination of the individual metals can be utilized to adjust the coating properties to the particular requirements.

In contrast to the tin-containing catalysts customary to date, crosslinking and pot life can be adjusted independently of one another in the context of coating application using the coating systems of the invention. Accordingly, the new combination of metals in accordance with catalyst component (C) represents a possibility for modeling a system in line with customary requirements. Furthermore, a functioning alternative to the Li-containing catalysts has been found. Relative to the catalysts based only on Bi, which possess a comparatively very high onset temperature, the catalysts of the invention have the advantage that the coating formulas in question dry more rapidly at application.

b)

TABLE 4

| | | AN | DR P1 [cm] | DR P2 [cm] | DR P1 + P2 [cm] |
|---|---|---|---|---|---|
| V3 | Bi | 15 | 8.9 | 14.7 | 23.6 |
| V4 | Bi | 20 | 4.4 | 5.5 | 9.9 |
| V5 | Bi | 25 | 5 | 6.9 | 11.9 |
| E3 | Bi/Ca | 1 | 8.6 | 15.6 | 24.2 |
| E4 | Bi/Ca | 8 | 3.2 | 6.2 | 9.4 |
| E21 | Bi/Ca | 15 | 5.1 | 4.5 | 9.6 |
| E22 | Bi/Ca | 20 | 4.2 | 4.1 | 8.3 |
| E23 | Bi/Ca | 25 | 5 | 4.4 | 9.4 |
| E10 | Bi/Na | 1 | 9.6 | 6 | 15.6 |
| E11 | Bi/Na | 8 | 3.8 | 4.7 | 8.5 |
| E5 | Bi/Na | 15 | 3 | 4.6 | 7.6 |
| E12 | Bi/Na | 20 | 2.8 | 3.2 | 6 |
| E13 | Bi/Na | 25 | 3 | 5.3 | 8.3 |
| E14 | Bi/Mg | 1 | 11.8 | 12.5 | 24.3 |
| E6 | Bi/Mg | 8 | 5.4 | 9.2 | 14.6 |
| E15 | Bi/Mg | 15 | 6.5 | 6.8 | 13.3 |
| E16 | Bi/Mg | 20 | 5.5 | 9.9 | 15.4 |
| E17 | Bi/Mg | 25 | 5.3 | 6.5 | 11.8 |
| E9 | Bi/Mg | 1 | 4.4 | 6.6 | 11 |
| E18 | Bi/Mg | 8 | 4 | 3.3 | 7.3 |
| E7 | Bi/Mg | 15 | 5 | 6.7 | 11.7 |
| E19 | Bi/Mg | 20 | 5 | 4.8 | 9.8 |
| E20 | Bi/Mg | 25 | 4.7 | 5.4 | 10.1 |
| E2 | Bi/K | 8 | 6.9 | 10.6 | 17.5 |
| E24 | Bi/K | 15 | 9.2 | 5.2 | 14.4 |
| E25 | Bi/K | 20 | 7.3 | 7.3 | 14.6 |
| E26 | Bi/K | 25 | 9 | 7.5 | 16.5 |

DR P1 + P2 = total from phase 1 and phase 2

The experiments with the Drying recorder method as per table 4 give a picture of the drying properties of the coating films for different acid numbers arising from the mixing ratio of the two components A1 and A2. Investigated in particular here are the lengths of the phases 1 and 2.

The length of phase 1 gives an indication of how quickly the coating film transitions from an uncrosslinked state into a partially crosslinked state. The transition is the point at which the coating film is no longer visible in gel form on the line, and the needle no longer completely "disintegrates" the coating.

In phase 2, the coating is already largely crosslinked, but is still sensitive to contact. Within this time, assembly operations on a coated part such as, for example, on a fender would still not be possible. Only at the end of phase 2 is it possible to carry out light assembly operations without damaging the coating surface.

The examples from table 4 show that with the coating material systems of the invention, satisfactory drying outcomes can be achieved even at acid numbers≤15 mg KOH/g. With a system catalyzed solely with Bi as catalytically active metal component, satisfactory drying outcomes are achievable only at acid numbers>15 mg KOH/g (see, for example, V4 and E4).

It was found, moreover, that when using polyhydroxy group-containing compounds having acid numbers of not more than 15 mg KOH/g, the coating material systems possess higher water resistance and hence weather resistance.

What is claimed is:

1. A coating material system comprising components (A) to (C) having:
   (A) at least one polyhydroxy group-containing compound, having an acid number, wherein the acid number of the polyhydroxy group-containing compound of component (A) is not more than 15 mg KOH/g of the corresponding polyhydroxy group-containing compound, wherein the polyhydroxy group-containing compound of component (A) is selected from the group consisting of polyacrylate polyols and/or polymethacrylate polyols,
   (B) at least one polyisocyanate-containing compound, and
   (C) as catalyst at least two salts of an aliphatic monocarboxylic acid having at least four carbon atoms, wherein the at least two salts each have a metal component, the metal component of the first salt comprising bismuth (Bi), and the metal component of the second salt comprising sodium (Na) and/or potassium (K),
   where
   i) components (A), (B), and (C) are present separately from one another or
   ii) are mixed wholly or at least partly with one another.

2. The coating material system as claimed in claim 1, wherein the catalyst of component (C)
   i) is produced by reaction of the corresponding hydroxides of Bi, Na, and/or K with at least one aliphatic monocarboxylic acid having at least four carbon atoms, and/or
   ii) the first salt and the second salt have the same aliphatic monocarboxylic acid as anion component of the respective salt.

3. The coating material system as claimed in claim 1, wherein in the coating material system the polyisocyanate-containing compound of component (B) is selected from 1,6-hexamethylene diisocyanate, isophorone diisocyanate, 4,4'-methylenedicyclohexyl diisocyanate, the biuret dimers of the aforesaid diisocyanates, iminooxadiazine-diones of the aforesaid diisocyanates and/or asymmetrical trimers of the aforesaid diisocyanates.

4. The coating material system as claimed in claim 1, which comprises at least one further component (D) to (J), selected from hydroxyl containing compounds (D), aminoplast resins and/or tris(alkoxycarbonylamino)triazines (E), coating additives (F), aromatic carboxylic acids (G), pigments (H), other fillers (I) and/or solvents (J),
   where
   i) the individual components (D) to (J) are present separately from one another or
   ii) are mixed wholly or at least partly with one another and/or with components (A) to (C).

5. The coating material system as claimed in claim 1, wherein
   i) the coating material system is not aqueous, and/or
   ii) components (A) and/or (B) each form a mixture with at least one solvent (J), but components (A) and (B) are present separately from one another, and/or
   iii) the catalyst of component (C) is present entirely or at least partly in at least one of the components (A) or (B) present separately from one another.

6. The coating material system as claimed in claim 1, wherein the aliphatic monocarboxylic acid in the catalyst of component (C) is a C6-C18 carboxylic acid.

7. The coating material system as claimed in claim 4, wherein the coating material system comprises as additional component at least one coating additive (F).

8. The coating material system as claimed in claim 1, wherein the coating material system is present as a complete mixture of components (A), (B), and (C) and also of optionally present components (D) to (J) selected from hydroxyl containing compounds (D), aminoplast resins and/or tris(alkoxycarbonylamino)triazines (E), coatings additives (F), aromatic carboxylic acids (G), pigments (H), other fillers (I) and/or solvents (J).

9. A method for producing a coating material system as claimed in claim 8, wherein components (A), (B), and (C) and also optionally present components (D) to (J) are provided separately from one another and subsequently mixed with one another,
   with components (A) and (C) being mixed with one another beforehand and/or component (B) being added to component (A) or to a mixture comprising component (A).

10. A method for producing a polyurethane by at least partial or complete curing of the coating material system as claimed in claim 8.

11. The method as claimed in claim 10, wherein the polyurethane forms a layer or coating or is at least part of a layer or coating.

12. The method as claimed in claim 10, wherein the polyurethane comprises at least one pigment (H) and/or wherein the polyurethane is applied in coat form to a basecoat film which optionally comprises at least one pigment (H), or to an optionally precoated substrate.

13. The method as claimed in claim 10, wherein the polyurethane is cured at temperatures of 20 to 80° C., the optional basecoat film having optionally been dried beforehand at temperatures of 20° C. to 80° C.

14. A method of applying a coating material in automotive finishing, for the repair of finishes, for automotive refinishing and/or for the coating of parts for installation in or on automobiles, of plastics substrates, or of commercial vehicles, wherein the method comprises the use of the coating material system as claimed in claim 1.

15. A method for producing a coating, wherein at least one coating material system as claimed in claim 1 is applied to an optionally precoated substrate or to a basecoat film.

16. The method as claimed in claim 15, wherein the coating comprises a polyurethane obtained by at least partial or complete curing of the coating material system.

17. A method for catalyzing a urethane reaction in the coating material system of claim 1 for producing polyurethanes, for producing a polyurethane, for producing a coating material, for repairing a finish, for automotive refinishing and/or for coating parts for installation in or on automobiles, for coating plastics substrates or for coating commercial vehicles, the method comprising the use of at least two salts of an aliphatic monocarboxylic acid having at least four carbon atoms, the metal component of the first salt comprising bismuth (Bi) and the metal component of the second salt comprising sodium (Na) and/or potassium (K), as catalyst in the coating material system.

18. The coating material system as claimed in claim 2, wherein the catalyst of component (C) is produced by reaction of the corresponding hydroxides of Bi, Na, and/or K with an excess of at least one aliphatic monocarboxylic acid, and/or using an aromatic solvent as azeotrope former for removing water.

* * * * *